US012456391B1

(12) United States Patent
D'Angelo et al.

(10) Patent No.: US 12,456,391 B1
(45) Date of Patent: Oct. 28, 2025

(54) READER COMPREHENSION ASSESSMENT AND ELECTRONIC BOOK CONTENT GENERATION SYSTEM

(71) Applicants: Christoper Scott D'Angelo, Northridge, CA (US); Kimberly Marie D'Angelo, Northridge, CA (US)

(72) Inventors: Christoper Scott D'Angelo, Northridge, CA (US); Kimberly Marie D'Angelo, Northridge, CA (US)

( * ) Notice: Subject to any disclaimer, the term of this patent is extended or adjusted under 35 U.S.C. 154(b) by 0 days.

(21) Appl. No.: 18/921,400

(22) Filed: Oct. 21, 2024

Related U.S. Application Data

(60) Provisional application No. 63/544,906, filed on Oct. 19, 2023.

(51) Int. Cl.
*G09B 17/00* (2006.01)
(52) U.S. Cl.
CPC .................. *G09B 17/003* (2013.01)
(58) Field of Classification Search
CPC .................................................. G09B 17/003
See application file for complete search history.

(56) References Cited

U.S. PATENT DOCUMENTS

| | | | | |
|---|---|---|---|---|
| 2014/0168054 A1* | 6/2014 | Yang | ...................... | G06F 3/013 345/156 |
| 2015/0082136 A1* | 3/2015 | Cameron | ................ | G06F 40/12 715/203 |
| 2015/0206442 A1* | 7/2015 | Brown | ...................... | G09B 5/02 434/362 |
| 2015/0338915 A1* | 11/2015 | Publicover | ............ | G06F 3/0482 345/633 |
| 2015/0370331 A1* | 12/2015 | Gonzales, Jr. | ........ | G06F 16/435 345/156 |
| 2016/0042648 A1* | 2/2016 | Kothuri | ..................... | G09B 7/04 434/236 |
| 2019/0196675 A1* | 6/2019 | German | ................... | G09B 5/06 |
| 2022/0188320 A1* | 6/2022 | Liu | ......................... | G06F 16/58 |
| 2023/0129473 A1* | 4/2023 | Watanabe | ................ | G09B 5/00 |
| 2023/0333639 A1* | 10/2023 | DiGiorgio | ............... | G06F 3/011 |
| 2024/0273793 A1* | 8/2024 | DeCharms | ............... | G09B 5/06 |

* cited by examiner

*Primary Examiner* — Eddy Saint-Vil
(74) *Attorney, Agent, or Firm* — Plager Schack LLP; Mark H. Plager; Stephen Hallberg

(57) ABSTRACT

A reader comprehension assessment and electronic book content generation system that uses artificial intelligence (AI), machine learning (ML), and multi-modal signals from a reader of an electronic book to assess comprehension and generate new content based on those assessments in real-time is disclosed. The reader comprehension assessment and electronic book content generation system actively measures the reader's ability and intention through gaze tracking, audio analysis, and touch tracking. The AI then combines these signals with personal preference data and creates customized content on the fly to deliver the optimal learning experience across curricula.

14 Claims, 4 Drawing Sheets

READER COMPREHENSION ASSESSMENT AND ELECTRONIC BOOK CONTENT GENERATION SYSTEM

CLAIM OF BENEFIT TO PRIOR APPLICATION

This application claims benefit to U.S. Provisional Patent Application 63/544,906, entitled "READER COMPREHENSION ASSESSMENT AND ELECTRONIC BOOK CONTENT GENERATION SYSTEM THAT USES AI AND MULTI-MODAL SIGNALS FROM THE READER TO ASSESS COMPREHENSION AND, BASED ON THE ASSESSMENTS, GENERATE NEW CONTENT IN REAL-TIME," filed Oct. 19, 2023. The U.S. Provisional Patent Application 63/544,906 is incorporated herein by reference.

BACKGROUND

Embodiments of the invention described in this specification relate generally to learning systems, and more particularly, to a reader comprehension assessment and electronic book content generation system that uses artificial intelligence (AI), machine learning (ML), and multi-modal signals from a reader of an electronic book to assess comprehension and generate new content based on those assessments in real-time.

All children must learn to read to be successful in life. Busy and/or illiterate parents and underfunded schools are unable to give each child a personalized teaching environment for maximum efficacy. Over time, the student becomes unmotivated and can fall well behind their peers, leading to a lower quality of life.

Other electronic products in the market are extensions of the classroom model. Essentially, most of these existing electronic products operate in a limited, one-way direction. Even the existing products which allow two-way interaction are limited to presenting information and receiving responsive communication from the viewing student, such as in a quiz or test format. None of the existing systems or products are designed to customize the content presentation in ways that are sensitive to the individual student. For instance, the existing devices, software systems, and other products in the field can drill, test, quiz, etc., a student or can provide content that explains the concepts of the subject matter lesson, but they cannot react to the student and/or generate specific content that will help to both engage and challenge the student. By extension, none of the existing options provide effective systems for applying insights gained across curricula. For instance, a student may have a certain proficiency in reading which can be customized in language lessons, but can also be applied across the board to other areas of the curriculum, such as math or science, where problems or information can be presented at the personalized reading level of the student to maximize proper understanding.

Therefore, what is needed is a way to measure a person's reading ability and intention through gaze tracking, touch tracking, and audio analysis, and based on this analysis, to generate customized content to deliver the optimal learning experience across curricula.

BRIEF DESCRIPTION

A novel reader comprehension assessment and electronic book content generation system is disclosed that uses artificial intelligence (AI), machine learning (ML), and signals from a reader ("user") of an electronic book to assess comprehension and generate new content based on those assessments in real-time. In some embodiments, the reader comprehension assessment and electronic book content generation system actively measures reading ability and intention of the user through signals derived from gaze tracking. In some embodiments, the reader comprehension assessment and electronic book content generation system combines the gaze tracking signals with personal preference data of a particular user to create customized content for the particular user in real-time.

In some embodiments, the reader comprehension assessment and electronic book content generation system actively measures reading ability and intention of the user through multiple, different signals ("multi-modal signals") comprising gaze tracking and at least one of touch tracking and audio analysis. In some embodiments, the reader comprehension assessment and electronic book content generation system combines the multi-modal signals with the personal preference data of the particular user to create the customized content for the particular user in real-time. In this way, the reader comprehension assessment and electronic book content generation system is able to deliver the optimal learning experience for the particular user in a single area of current focus or across an entire curriculum. For example, the reader comprehension assessment and electronic book content generation system can gain insights about the particular user's reading ability by tracking the user's gaze (or tracking multiple signals, such as gaze and touch from finger gestures reading along word-by-word, or gaze and audio from read-along vocalization by the user) while the user is reading. These insights can then be applied across curricula such that a math or science problem can be presented in a written (language-based) form at a personalized reading level of the particular user to maximize the user's understanding of the math/science question.

In some embodiments, the reader comprehension assessment and electronic book content generation system comprises (i) an account management system configured for set-up and tracking of account information for a user (such as a student, a child learner, etc.), (ii) an electronic book of content through which the user engages with the system which performs reader comprehension assessments while the user is reading the content of the electronic book, (iii) an eye gaze tracking device—such as a camera (which may be an onboard camera of the electronic book device) or a LiDAR (Light Detection and Ranging) scanning device—configured to track the user's gaze to understand speed, fixations, regressions, skips, and areas of interest among other signals, (iv) an audio pick-up microphone of the electronic book device which is configured to capture audio while the user is reading aloud, wherein the speech of the user is processed by the reader comprehension assessment and electronic book content generation system to understand the user's reading ability, (v) a touchscreen display that is configured to capture touch gestures of the user, such as finger-based touch/dragging which demonstrates finger speed follow along as the user reads, wherein the reader comprehension assessment and electronic book content generation system analyzes the touch gestures to understand user intentions and whether those intentions match up to other signal modalities including audible vocalization of the words being read, finger speed follow along while reading, and eye speed, and tracking and learning from the user's contextual touches for help, (vi) an artificial intelligence (AI) engine that combines at least the gaze tracking signals (or some/all of the multi-modal signals) with a curriculum, a pedagogy, and personal information from the set-up to customize, in real-time, content that is correct, challenging, and engaging for the user, (vii) a new page content generator which, in connection with the AI engine, is configured to generate each new page of content for the electronic book to present to the user in real-time, and (viii) a performance data storage that is configured to store the user's performance for the user interactions with all electronic books engaged by the user.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
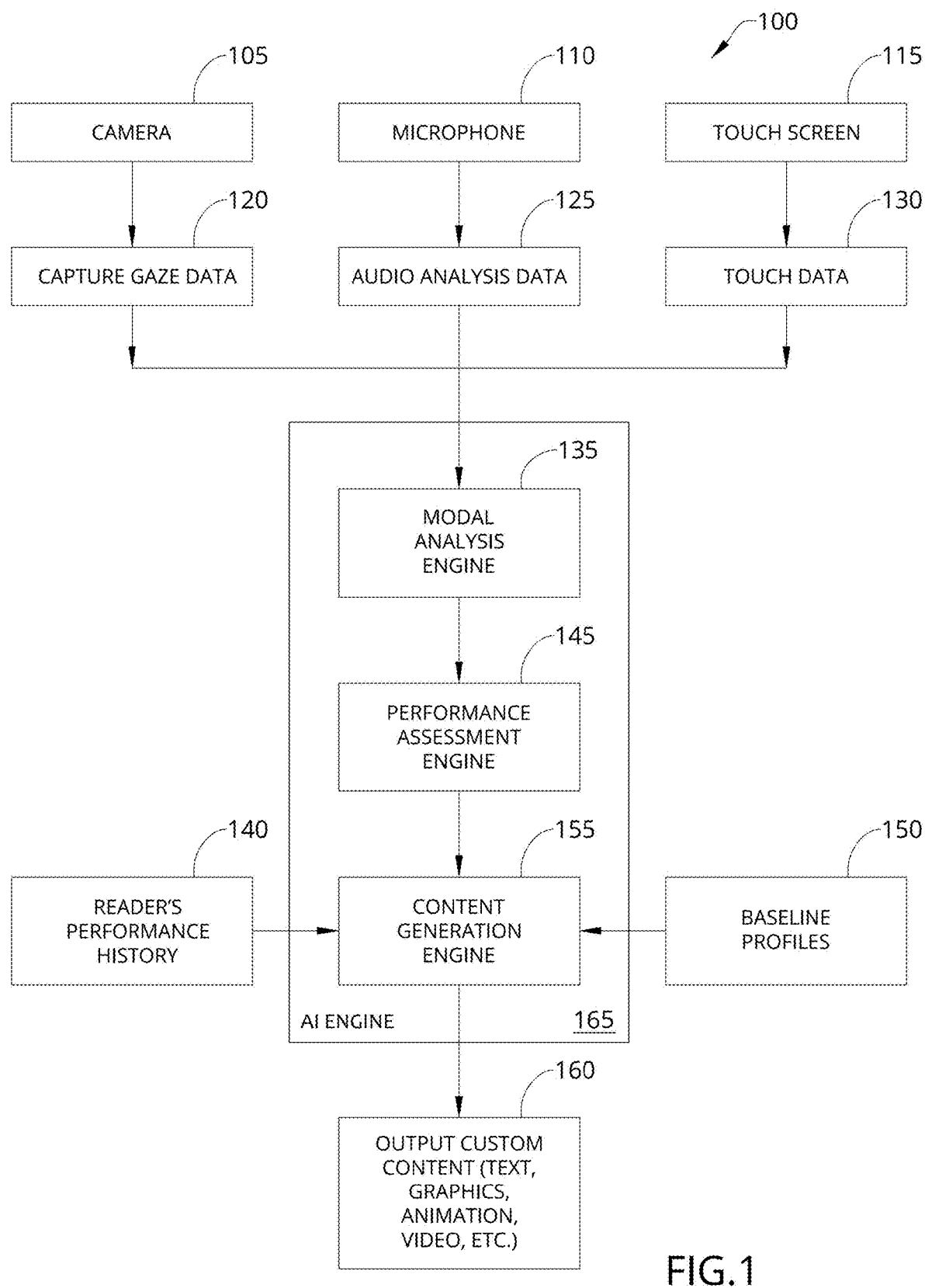
FIG. 1 conceptually illustrates a flow diagram for the reader comprehension assessment and electronic book content generation system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications. Also, for purposes of this specification, the term "book" and "electronic book" are used variously throughout the description. However, it is noted here that either of these terms is intended to broadly encompass any electronic conveyance of textual information, lessons, instruction, etc., which may be presented in any of several different forms including, without limitation, e-books, games, other computer applications, or other digital formats, and on any of several hardware device technology, such as custom electronic book devices, computing devices, communication and mobile devices, etc. Additionally, while the reader comprehension assessment and electronic book content generation system is described herein as using artificial intelligence (AI) and machine learning (ML), it is noted that this is not exclusive and does not prevent the reader comprehension assessment and electronic book content generation system from using other types of execution, computation, and processing through conventional or quantum computing devices or any other such devices.

Embodiments of the invention described in this Specification include a reader comprehension assessment and electronic book content generation system. In some embodiments, the reader comprehension assessment and electronic book content generation system uses AI, ML, and signals from a reader (or "user") of an electronic book to assess comprehension and generate new content based on those assessments in real-time. In some embodiments, the reader comprehension assessment and electronic book content generation system actively measures reading ability and intention of the user through signals derived from gaze tracking. In some embodiments, the reader comprehension assessment and electronic book content generation system actively measures reading ability and intention of the user through multiple, different signals ("multi-modal signals") comprising gaze tracking and at least one of touch tracking and audio analysis. In this way, the reader comprehension assessment and electronic book content generation system is able to deliver the optimal learning experience for the particular user in a single area of current focus or across an entire curriculum.

In some embodiments, the reader comprehension assessment and electronic book content generation system comprises an AI engine, a gaze tracking device, a microphone, a touch-sensitive display screen (or "touchscreen"), an electronic book, and a performance data storage. In some embodiments, the reader comprehension assessment and electronic book content generation system further comprises an account management system. In some embodiments, the reader comprehension assessment and electronic book content generation system further comprises an audio speaker configured to output audible sound.

In some embodiments, the gaze tracking device comprises a camera. In some embodiments, the camera comprises an onboard camera of the electronic book. In some embodiments, the camera comprises an external camera that is communicably connected to the electronic book. In some embodiments, the external camera is communicably connected to the electronic book via a hardwired data cable connection. In some embodiments, the external camera is communicably connected to the electronic book via a wireless connection. In some embodiments, the camera is configured to capture gaze imagery of a particular user engaged with the electronic book. In some embodiments, the gaze imagery captured by the camera comprises video of the gaze of the eyes of the particular user. In some embodiments, the gaze imagery captured by the camera comprises one or more digital image(s) of the gaze of the particular user. In some embodiments, the gaze imagery captured by the camera comprises a video clip of the gaze of the particular user.

In some embodiments, the gaze tracking device comprises a LiDAR scanning device that is configured to track the user's eyes scanning the electronic book as the user engages with the content in the electronic book. In some embodiments, the LiDAR scanning device is further configured to determine the disposition of the particular user's facial features in space while the particular user is actively engaged with the electronic book.

In some embodiments, the microphone is configured to capture audio of the particular user engaged with the electronic book.

In some embodiments, the touchscreen is configured to capture touch data of the particular user making touch gestures in contact with the touchscreen while engaged with the electronic book.

In some embodiments, the AI engine comprises a modal analysis engine, a performance assessment engine, and a content generation engine.

In some embodiments, the modal analysis engine is configured to receive and analyze the gaze imagery captured by the camera and output resulting gaze analysis data to the content generation engine. In some embodiments, the modal analysis engine is configured to receive and analyze the audio data captured by the microphone and output resulting audio analysis data to the content generation engine. In some embodiments, the modal analysis engine is configured to receive and analyze the touch data captured by the touchscreen and output resulting touch analysis data to the content generation engine.

In some embodiments, the performance assessment engine is configured to receive and evaluate performance data while the particular user is engaged with the electronic book and output resulting performance assessment data to the content generation engine. In some embodiments, the performance data is received when the particular user makes performance interactions while engaged with the electronic book. Performance interactions include user interactions such as touch gestures to make selections, keyboard text input (physical or virtual-screen-displayed keyboard input) to provide written or numerical data input, etc. Notably, performance data may not be received in some instances, such as when the particular user is reading material provided in the electronic book. On the other hand, performance data may be received when the particular user is making selections or entering data/text while working through test, quiz, practice, lesson, etc., content of the electronic book. The performance data may be received in real-time or at particular moments, such as the conclusion of a quiz or test. When performance data is received (whether in real-time or at particular moments), the performance assessment engine evaluates the particular user's performance with respect to the content and curriculum. In some embodiments, the performance assessment engine retrieves performance history data of the particular user from the performance history data storage and compares the received performance data to the performance history data.

In some embodiments, the content generation engine is configured to create and provide a personalized learning experience in real-time based on content and curriculum data, personal preference data of the particular user, and the results of the gaze analysis, the touch analysis, and the audio analysis performed by the modal analysis engine. In some embodiments, the content generation engine also retrieves performance history data of the particular to create and provide the personalized learning experience for the particular user. In some embodiments, the content generation engine also retrieves baseline profile data associated with the particular user to create and provide the personalized learning experience for the particular user. In some embodiments, the content generation engine is further configured to augment the creation and provisioning of the personalized learning experience based on the resulting performance assessment data provided by the performance assessment engine.

In some embodiments, the content generation engine comprises a new page content generator that is configured to generate and output custom content of each display page of the electronic book in real-time. In some embodiments, the new page content generator creates a single display page of the electronic book with the generated custom content based on a location in the electronic book. In some embodiments, the location in the electronic book is a current page display of the electronic book and the new page content generator creates a next page, with the generated custom content, to display in the electronic book. In some embodiments, the new page generator creates a plurality of display pages of the electronic book with the generated custom content based on the location in the electronic book and a layout for the custom content to display on each page of the plurality of display pages. In some embodiments, the custom content comprises one or more of written content in text form, graphics content in two-dimensional (2D) or three-dimensional (3D) form, animated content, video content, audio content that is configured for audible playback out of the speaker.

In some embodiments, the reader comprehension assessment and electronic book content generation system further comprises a device that operable by a particular user. Examples of the device include, without limitation, computing devices such as laptops, desktop computers, etc., mobile devices such as smart phones and tablet computing devices, and other computing or computational devices, such as single board computers (SBC), custom electronic book devices, etc. In some embodiments, the device comprises a display screen. In some embodiments, the touchscreen of the reader comprehension assessment and electronic book content generation system is the display screen of the device. In some embodiments, the device is configured to visually output the electronic book on the touchscreen of the device. In some embodiments, the device further comprises an onboard camera. In some embodiments, the camera of the reader comprehension assessment and electronic book content generation system is the onboard camera of the device. In some embodiments, the device further comprises an onboard microphone. In some embodiments, the microphone of the reader comprehension assessment and electronic book content generation system is the onboard microphone of the device. In some embodiments, the device further comprises an onboard speaker. In some embodiments, the audio speaker of the reader comprehension assessment and electronic book content generation system is the onboard speaker of the device.

Embodiments of the reader comprehension assessment and electronic book content generation system described in this specification differ from and improve upon currently existing options. In particular, current methods are specifically for teaching in classrooms where the teacher presents a single generic lesson for multiple students and, after a time, tests the students to confirm performance. When at home, a caregiver may not be available or capable of giving the user the one-on-one support needed to fill in the gaps left by traditional classrooms. Other existing devices and processes do not work well because they do not have an understanding of each child's personal ability and, therefore, typically fail in reacting to deficits in real-time with newly generated or presented content. By contrast, the reader comprehension assessment and electronic book content generation system described in this disclosure maintains an awareness of the user across all interactions in real-time and is able to adjust the content accordingly, for maximum efficacy. Specifically, the reader comprehension assessment and electronic book content generation system actively measures the reader's ability and intention through gaze tracking, audio analysis, and touch tracking. In some embodiments, the reader comprehension assessment and electronic book content generation system includes an artificial intelligence (AI) engine that is configured to combine these signals with personal preference data and create customized content on-the-fly (that is, in real-time) to deliver the optimal learning experience across curricula.

The reader comprehension assessment and electronic book content generation system of the present disclosure may be comprised of the following components.

1. An account management system configured for set-up and tracking of account information for a child learner ("user"). Specifically, the reader comprehension assessment and electronic book content generation system is configured with account management in any form to manage account information for users.

2. An electronic book (or multiple electronic books) of content through which the user engages with the system, which itself is configured to perform reader comprehension assessments while the user is reading the content of the electronic book. For instance, while user reads a passage, an article, a book, etc., the system monitors touch, eyes, audio, etc., to determine comprehension and other aspects of reading.

3. A gaze tracking device, such as a camera or multiple cameras, to track gaze and capture video/imagery. This is typically an onboard camera (but can be external). Also, the camera may be a conventional digital camera configured to capture imagery/video in the human-visible spectrum or an InfraRed camera configured to capture imagery/video in infrared spectrum. Beyond cameras, the gaze tracking device can be a LiDAR scanning device or a combination of camera plus LiDAR scanner. Whatever form of gaze tracking device (hereinafter used interchangeably with the term "camera" but understood to be inclusive of LiDAR scanning devices and other gaze tracking technologies), the user's gaze is detected by tracking the user's eyes. By tracking the user's gaze (eyes), the system is able to understand speed, fixations, regressions, skips, and areas of interest among other signals.

4. An audio pick-up microphone configured to capture audio while the user is reading aloud. With this, it is possible to capture the audible vocalizations of the user for processing by the reader comprehension assessment and electronic book content generation system to understand the user's reading ability (e.g., phonetic awareness, level, and level of comfort with decoding, etc.). This could be similarly used for foreign language learning, where audible conversational interactions are captured and analyzed to determine strengths and weaknesses of the user's competency in the foreign language.

5. A touchscreen display that is configured to capture touch gestures of the user while reading so that the reader comprehension assessment and electronic book content generation system can analyze the touch gestures (such as reading with a leading finger) to understand their intentions and how that matches up to the other modalities, such as eye gaze (does eye gaze match with the user's finger speed follow along?), also can identify contextual touches, help touches, etc.

6. An artificial intelligence (AI) engine which combines these multi-modal signals with a curriculum, a pedagogy, and personal information from the set-up to customize, in real-time, content that is correct, challenging, and engaging for the user. As noted above, the AI engine may include sub-components. These are described in greater detail below, by reference to FIGS. 1 and 2.

7. A new page content generator of the AI engine that is configured to generate new pages of content based on the analysis of the user's reading up to now, new content pages generated and presented in real-time to the user.

8. A performance data storage that is configured to store the user's performance for the user interactions with all electronic books engaged by the user on the platform.

The various components of the reader comprehension assessment and electronic book content generation system of the present disclosure may be related in the following exemplary fashion. As the user reads (2), reading performance data is determined by tracking eye-gaze captured by the camera(s) as conventional digital imagery/video or Infra-Red imagery/video (3) (or data captured by a LiDAR scanning device, if so utilized). When multi-modal signals are supported and utilized by the system, the multi-modal performance data is determined by the eye-gaze tracking of the camera (3), as well as either audio analysis (4) or touch inputs (5), or both audio and touch data. The AI engine (6) interprets these signals along with any personal information from set-up (1) or otherwise to generate or customize content for higher likelihood of engagement and efficacy (7). This information is stored by the reader comprehension assessment and electronic book content generation system to accommodate user growth across the product line (8). A detailed example of the relationship between the components of the reader comprehension assessment and electronic book content generation system is described further below, by reference to FIG. 3.

The reader comprehension assessment and electronic book content generation system of the present disclosure generally works by using machine learning of the AI engine to train a neural network (or "model") to recognize and distinguish inputs from a caregiver (in the form of preferences) and, for example, a young reader (in the form of multi-modal inputs or verbal interactions), to generate new or customized content according to the curriculum of the experience at hand, and the overarching pedagogy and scope and sequence based on the core lesson or text of the individual product along with personal preferences. On the other hand, when the user is old enough to self-pace through various material, the reader comprehension assessment and electronic book content generation system would continue improving the model based on the interactions of that user with respect to the subject matter content presented in one or more electronic books.

By way of example, FIG. 1 conceptually illustrates a flow diagram for the reader comprehension assessment and electronic book content generation system 100. As shown in this figure, the flow diagram for the reader comprehension assessment and electronic book content generation system 100 includes a camera 105, a microphone 110, a touch screen 115, and an AI engine 165. Specifically, the camera 105 captures the user's gaze data 120 and provides to the AI engine 165. Similarly, the microphone 110 captures audio data 125 as vocalized by the user (if any) for analysis by the AI engine 165. Finally, the touch screen 115 captures touch data 130 based on touch gesture inputs of the user, if any.

The AI engine 165 itself includes a plurality of sub-components, namely, a modal analysis engine 135, a performance assessment engine 145, and a content generation engine 155. Specifically, the modal analysis engine 135 is configured to combine the various captured data together (gaze, audio, and touch) and analyze how the user is engaging with the electronic book. A detailed example of the content generation engine 155 creating a personalized learning experience for a user based on the gaze analysis, touch analysis, and audio analysis of modal analysis engine 135 is described below, by reference to FIG. 2.

Another sub-component is the performance assessment engine 145. In some embodiments, the performance assessment engine 145 assess the analyzed gaze, audio, and/or touch data to determine a relative performance of the user while engaging with the content of the electronic book. In some embodiments, the performance engine 145 also evaluates performance of conventional inputs for tests, quizzes, and other interactive elements of the electronic book which prompt the user for an answer, an explanation, or other information. This helps to clarify the thought process of the user which, in addition to gaze analysis, audio analysis, and touch analysis, can provide a comprehensive understanding of the user's performance with respect to the material in the electronic book. In addition, the AI engine 165 may retrieve the user's historical performance data from the performance data storage. By making the historical performance data available, the performance assessment engine 145 can then evaluate current performance in a more nuanced manner that is customized for the particular user—specifically in comparison to past performance data of the user.

Another sub-component is the content generation engine 155. The content generation engine 155 generates content to present in the electronic book based on the results of the modal analysis performed by the model analysis engine 135 and/or the performance results of the performance evaluation performed by the performance assessment engine 145 (and historical performance of the user). Furthermore, the content generation engine 155 is configured to generate and present the new content in real-time. In this way, the electronic book is highly customized to the user's needs at any given moment since, in certain embodiments, the content of each successive page in the electronic book is generated on the fly (that is, in real-time). Furthermore, the electronic book can be customized in other regards. For instance, the AI engine 165 may retrieve baseline profiles 150 with preference data which enables generation of content that is challenging to the user, but is also consistent with the user's own preferences or idiosyncrasies. Ultimately, the AI engine 165 provides a highly customizable electronic book to the user, as the content generation engine 155 outputs the custom content 160 in the electronic book. As noted above, the custom content generated by the content generation engine 155 may be written content in text form, graphics, animations, images, video clips, audio clips, etc.

To make the reader comprehension assessment and electronic book content generation system of the present disclosure, one may start by training the various AIs with the proper data for eye gaze, audio analysis, and touch tracking analysis. Then create the interface between the user and the system along with digital content for several "books". These books may be designed so as to be engaging and flexible to keep a child interested and also allow for AI customization in real-time. This would involve at least the understanding of gaze analysis, touch analysis, and audio analysis, which are described below, by reference to FIG. 2. One would be helped by having an understanding of early childhood development and entertainment principles, possessing a curriculum that has scope and sequence, and designing a pedagogical philosophy. Also possible that one may manufacture the devices/systems to garner the multi-modal inputs, camera arrays, and or accouterments that improve the accuracy of gaze tracking, an audio analysis suite designed and trained with appropriate ages. However, electronic books may be displayed on existing devices, such as mobile devices, computers, book reader devices, etc.

Figure 2:
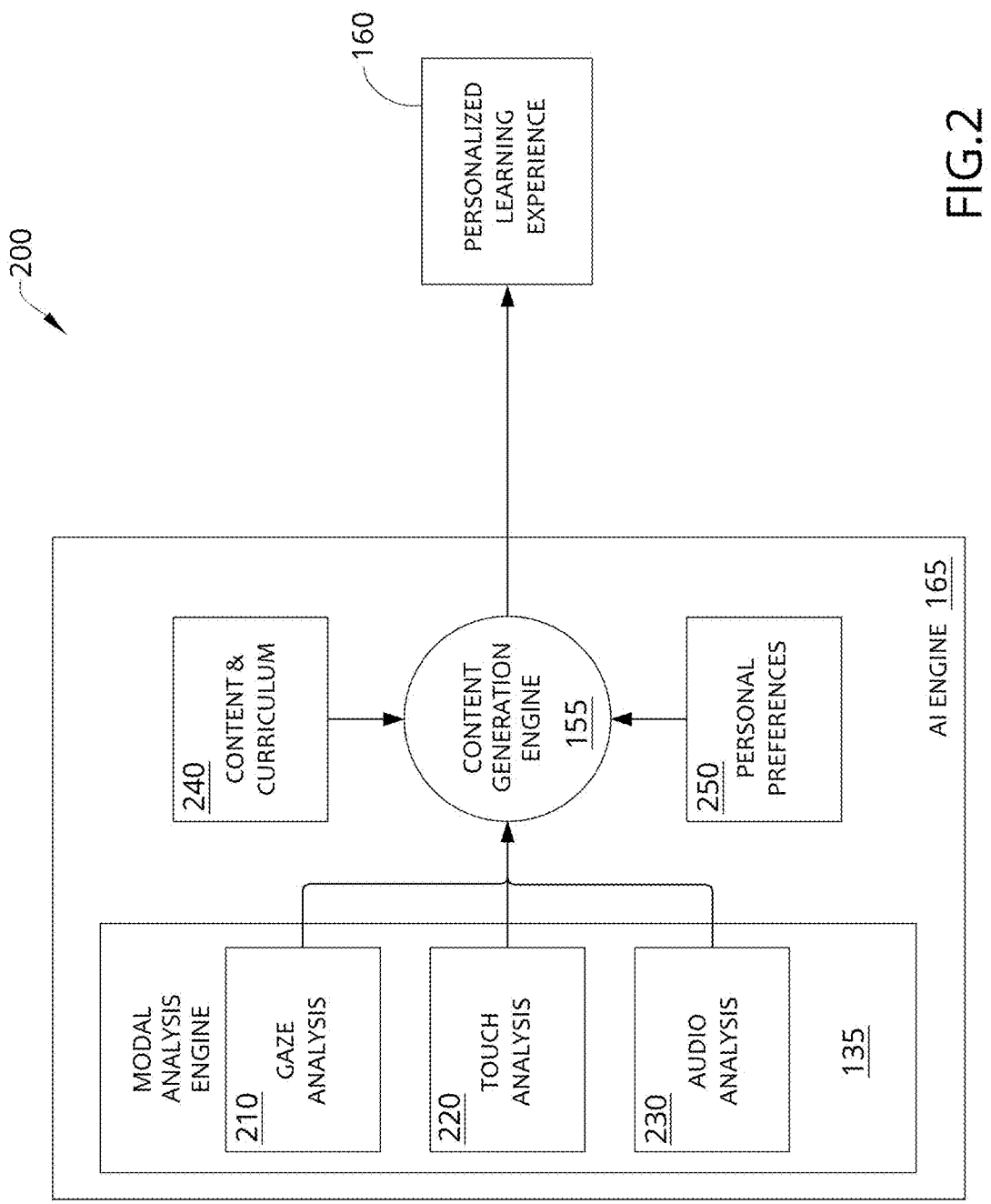
FIG. 2 conceptually illustrates a detailed example of creation of the personalized learning experience in some embodiments based on gaze analysis, touch analysis, and audio analysis.

Turning now to FIG. 2, the AI engine 165 is shown with the modal analysis engine 135 and content generation engine 155 to demonstrate how the personalized learning experience gets generated. Specifically, as shown in this figure, the modal analysis engine 135 provide the gaze analysis data 210, the touch analysis data 220, and the audio analysis data 230 to the content generation engine 155. Contemporaneously, the content generation engine 155 retrieves the content and curriculum 240 as well as personal preferences 250. Based on all of these inputs (the gaze analysis data 210, the touch analysis data 220, the audio analysis data 230, the content and curriculum 240, and the personal preferences 250), the content generation engine 155 generates content that is expected to be challenging to the particular user. Specifically, the generated content is created in real-time as the user is engaged with the electronic book and is visually output in the next "page" of the electronic book, thereby providing the personalized learning experience 160 customized for the particular user.

While the example demonstrated in this figure is focused on the AI engine 165 and the way in which the personalized learning experience 160 gets generated and output in real-time, a more comprehensive example of the reader comprehension assessment and electronic book content generation system is described further below, by reference to FIG. 3. Nevertheless, it is understood that as technologies develop, the reader comprehension assessment and electronic book content generation system could be improved with better cameras, better trained AIs, inclusion in larger learning machines (such as robots), etc. Also, the input data or one's level could be imported through other means, such as by actual observation or as presented in a general fashion which is not truly personalized, but pulled from other performance-level data representing a swath of age groups or reading levels.

To use the reader comprehension assessment and electronic book content generation system of the present disclosure, a reader/user would use this device by turning it on and selecting an experience. It could be a book for casual reading or it could be used as a teaching device, or skill development for any age group. The reader comprehension assessment and electronic book content generation system of the present disclosure solves a specific problem of giving one-on-one teaching and feedback in real-time to allow the user to grow and learn with or without supervision.

Figure 3:
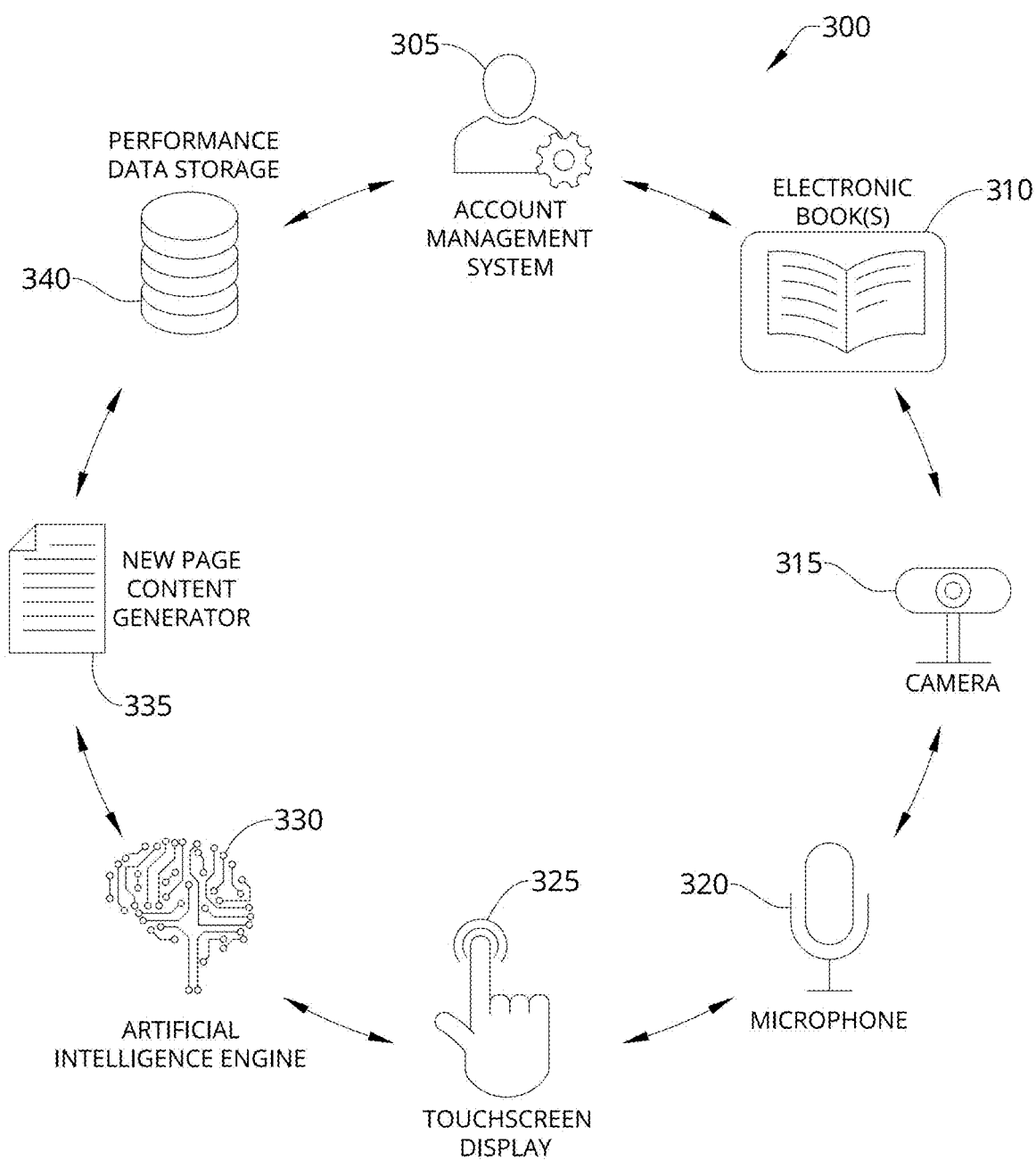
FIG. 3 conceptually illustrates components of a reader comprehension assessment and electronic book content generation system in some embodiments.

By way of example, FIG. 3 conceptually illustrates components of a reader comprehension assessment and electronic book content generation system 300. As shown in this figure, the components of the reader comprehension assessment and electronic book content generation system 300 comprise an account management system 305, an electronic book 310, a camera 315, a microphone 320, a touchscreen display 325, an AI engine 330, a new page content generator 335, and a performance data storage 340.

In some embodiments, the account management system 305 is configured for set-up and tracking of account information for a user, such as a child learner, a student, or any other person seeking to learn something through engagement with the electronic book 310. In some embodiments, the account management system 305 provides a unique identifier (UID) for the user. The UID of the user is different from the UIDs of other users. Additionally, historical performance data of each user is associated with the respective user's UID. In this way, the reader comprehension assessment and electronic book content generation system 300 is able to provide personalized learning experiences for all users, according to their own needs, preferences, learning styles, etc.

In some embodiments, the electronic book 310 comprises an interactive interface that enables the user to engage with the content presented on various "pages" of the electronic book. The electronic book 310 may be displayed on the touchscreen display 325 of a device operable by the user while being communicably connected to other components of the reader comprehension assessment and electronic book content generation system 300. Through the electronic book 310, the user may view content, provide audible information, or interact with the screen via touch gestures. This allows the reader comprehension assessment and electronic book content generation system 300 to analyze the user's gaze, audio, or touch data to provide custom generated content in real-time as the user continues through the electronic book 310. In some embodiments, the electronic book 310 is configured to perform reader comprehension assessments while the user is reading the content of the electronic book 310.

In some embodiments, the camera 315 is configured to track the user's gaze as the user views the electronic book 310 and to capture gaze data, in the form of video or digital images, of the user's gaze as the user views the electronic book 310. By tracking the user's gaze with the camera 315, the reader comprehension assessment and electronic book content generation system 300 is able to understand the user's speed, fixations, regressions, skips, and areas of interest among other signals. The camera 315 may be a single onboard camera 310 or multiple onboard cameras of the electronic book 310 or a device through which the electronic book 310 is presented.

In some embodiments, the microphone 320 comprises an audio pick-up microphone that is either an onboard or externally attached microphone of the electronic book 310 or device through which the electronic book 310 is presented. The microphone 320 is configured to capture audio while the user is vocalizing. For instance, the user may be reading the text content of the electronic book 310 out loud such that the microphone 320 captures the user's vocalizations. In this way, the reader comprehension assessment and electronic book content generation system 300 can process the speech of the user to understand the user's reading ability.

In some embodiments, the touchscreen display 325 is configured to visually display content of the electronic book 310 and capture touch gestures of the user while the user engages with the content in the electronic book 310. The touchscreen display 325 may be a native display of an electronic book device or a screen of a device operated by the user and on which the electronic book 310 is displayed. Either way, the reader comprehension assessment and electronic book content generation system 300 of some embodiments analyzes the touch gestures to understand user intentions and determine whether those intentions match up to the other modalities, including finger speed (for follow along reading) and eye speed, and tracking and learning from the user's contextual touches for help, etc.

In some embodiments, the AI engine 330 combines the multi-modal signals (eye gaze, audio vocalizations, touch gestures/input) with a curriculum, a pedagogy, associated content, and personal information (profile info, e.g., from set-up), personal historical performance data, etc., to customize, in real-time, content that is correct, challenging, and engaging for the user. In some embodiments, the AI engine 330 is configured to generate each new page of content, via the new page content generator 335, for the presentation in the electronic book 310 in real-time.

In some embodiments, the performance data storage 340 is configured to store performance data of the user's performance over time. Thus, the performance data for the user is stored in the performance data storage 340 with a unique identifier (UID) that links the performance data to a unique user profile for the user managed by the account management system 305. Notably, the performance data stored in the performance data storage 340 is historical performance data that may be based on interactions with a single electronic book or multiple, different electronic books, and/or a variety of content covering different subjects and curricula over time. In this sense, the electronic book 310 described in this figure is a representative of a single electronic book. However, it should be understood that the electronic book 310 can be any one or multiple electronic books which the user interacts with in his or her efforts to engage with (and learn) the content/material.

Additionally, the reader comprehension assessment and electronic book content generation system could be adapted for use in teaching reading in a second language, math, and other skills and curricula. The reader comprehension assessment and electronic book content generation system can be used to make texts easier for anyone to read, depending on real-time performance. The reader comprehension assessment and electronic book content generation system can also be used for rehabilitation after brain injuries or malfunctions or to assist persons with ADHD, dyslexia, or color-blindness.

The above-described embodiments of the invention are presented for purposes of illustration and not of limitation. Also, reference is made to the electronic book in some of the descriptions above. The electronic book is an electronic system. Furthermore, other computing devices or electronic systems embodied in network, computer, visual display, or communication technology hardware devices, and which typically include microprocessors or controllers, are examples of other electronic systems. The next description refers to an exemplary electronic system.

Figure 4:
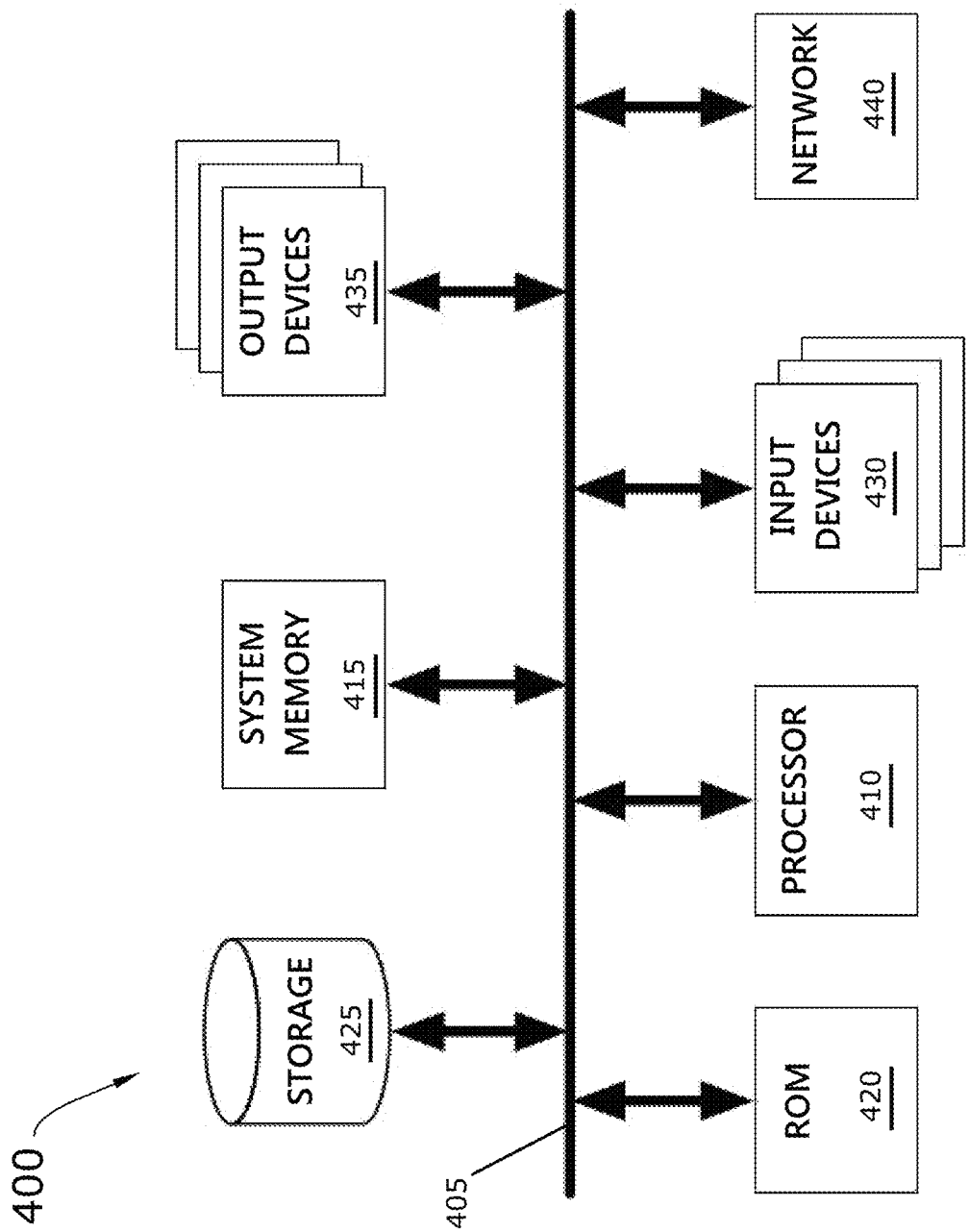
FIG. 4 conceptually illustrates an electronic system with which some embodiments of the invention are implemented.

Specifically, and by way of reference, FIG. 4 illustrates an exemplary electronic system 400. The electronic system 400 may be an electronic book or any other type computing device, such as a server, a desktop computer, a laptop computer, a single board computer (SBC), a mobile device, a tablet computing device, etc. The electronic system 400 may be wired to a network or capable of wireless communication and act as any type of digital communication device, such as cell phone, a smart phone, a tablet computing device, or any other sort of electronic device capable of wireless communication. Such an electronic system includes various types of computer readable media and interfaces for various other types of computer readable media. Electronic system 400 includes a bus 405, processing unit(s) 410, a system memory 415, a read-only memory 420, a permanent storage device 425, input devices 430, output devices 435, and a network 440.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. For instance, eye tracking is most often described above in connection with a camera, with mention of optional gaze tracking technologies, such as LiDAR. Nevertheless, a person of ordinary skill in the art would appreciate that eye/gaze tracking is not limited to infrared or conventional camera tracking, or LiDAR scanning, but is supported by utilization of other technologies, methods, or practices that are capable of tracking gaze (via eye direction and movement). Furthermore, the gaze tracking device/technology may not be limited to only gaze tracking, but may be utilized to determine the disposition of facial elements in space, such as would be possible by utilization of a LiDAR scanner. For instance, LiDAR scanning would result in output that is akin to a topographical readout of the facial elements or features of the user. In this way, LiDAR could be deployed to infer gaze direction, but also to determine overall attention of the user by analyzing all facial elements or features of the user. Thus, one of ordinary skill in the art would understand that the invention is not to be limited by the foregoing illustrative details, but rather is to be defined by the appended claims.

We claim:

1. A reader comprehension assessment and electronic book content generation system comprising:
   an account management system configured to set-up an account for a child learner ("user");
   an electronic book operable by the user, wherein the electronic book comprises an interactive interface that presents a plurality of pages with written content that engages the user in a reading exercise of reading the written content;
   a gaze tracking device configured to track gaze of the user by capturing a gaze signal comprising eye movements of eyes of the user as the user is reading the written content on a particular page in the plurality of pages;
   a microphone of the electronic book device that is configured to capture audio;
   a touchscreen display of the electronic book device that is configured to visually output the written content and capture touch gestures of the user;
   an artificial intelligence (AI) engine comprising (i) a modal analysis engine that is configured to analyze, in real-time, the gaze signal to understand areas of interest pertaining to reading the written content on the particular page and, based on the gaze signal analysis, generate resulting gaze analysis data and (ii) a content generation engine that is configured to generate, in real-time, a customized page of written content based on the resulting gaze analysis data in combination with other user data comprising personal information of the user entered into the account management system for set-up of the account for the user and visually output the customized page of written content on a next page in the plurality of pages presented in the electronic book; and
   a performance data storage that is configured to store performance data of the analyzed gaze signal of the user based on the written content read by the user and to store and track all performance data of all analyzed gaze signals of the user based on all written content read from all electronic books by the user.

2. The reader comprehension assessment and electronic book content generation system of claim 1, wherein the AI engine further comprises a performance assessment engine configured to (i) receive and evaluate performance data while the user is engaged with the electronic book, (ii) output resulting performance assessment data to the content generation engine, and (iii) store the resulting performance assessment data in the performance data storage.

3. The reader comprehension assessment and electronic book content generation system of claim 1, wherein a reader comprehension assessment is performed by the performance assessment engine while the user is reading the written content of the electronic book.

4. The reader comprehension assessment and electronic book content generation system of claim 1, wherein the gaze tracking device comprises a camera.

5. The reader comprehension assessment and electronic book content generation system of claim 4, wherein the camera comprises an onboard camera of the electronic book device.

6. The reader comprehension assessment and electronic book content generation system of claim 5, wherein the camera comprises a conventional digital camera configured to capture the gaze signal as imagery and video of the eyes of the user as the user is reading the written content.

7. The reader comprehension assessment and electronic book content generation system of claim 5, wherein the camera comprises an infrared camera configured to capture the gaze signal as infrared imagery and video of the eyes of the user as the user is reading the written content.

8. The reader comprehension assessment and electronic book content generation system of claim 1, wherein the areas of interest pertaining to reading the written content comprise at least one of a speed of reading the written content, a fixation while reading the written content, a regression while reading the written content, and a skip while reading the written content.

9. The reader comprehension assessment and electronic book content generation system of claim 8, wherein the microphone is configured to capture audio speech of the user as the user reads the written content aloud, wherein the captured audio speech is a speech signal, wherein a plurality of a multi-modal signals comprising the speech signal in combination the gaze signal are analyzed by the AI engine to understand the user's reading ability.

10. The reader comprehension assessment and electronic book content generation system of claim 8, wherein the touchscreen display is configured to capture touch gestures of the user as a touch signal, wherein the touch gestures are captured as the user follows with a finger under the written content while the user reads the written content, wherein the finger under the written content is in contact with the touchscreen display and is dragged along the touchscreen display under the written content while the user reads the written content, wherein a plurality of a multi-modal signals comprising the touch signal in combination the gaze signal are analyzed by the AI engine to understand the user's reading ability.

11. The reader comprehension assessment and electronic book content generation system of claim 1, wherein the customized page is generated to provide the user with a personalized learning experience that is updated in real-time while the user is engaged with the electronic book.

12. The reader comprehension assessment and electronic book content generation system of claim 1, wherein the other user data comprises past performance data of the user's interactions with electronic books previously engaged by the user.

13. The reader comprehension assessment and electronic book content generation system of claim 12, wherein the past performance data is retrieved from the performance data storage.

14. The reader comprehension assessment and electronic book content generation system of claim 1, wherein the content generation engine is further configured to retrieve content and curriculum and personal preferences of the user, wherein the content generation engine uses the content and curriculum and the personal preferences of the user to generate content that challenges the user and present the written content in the customized page along with the content that challenges the user.

\* \* \* \* \*